United States Patent [19]
Hirata

[11] Patent Number: 5,238,394
[45] Date of Patent: Aug. 24, 1993

[54] MOLD CLAMPING APPARATUS FOR MOLDING APPARATUS

[75] Inventor: Hisakazu Hirata, Nagano, Japan

[73] Assignee: Nissei Jushi Kogyo K.K., Nagano, Japan

[21] Appl. No.: 989,912

[22] Filed: Dec. 11, 1992

Related U.S. Application Data

[63] Continuation of Ser. No. 734,997, Jul. 24, 1991, abandoned.

[30] Foreign Application Priority Data

Jul. 27, 1990 [JP] Japan .................. 2-200594

[51] Int. Cl.⁵ .............................................. B29C 45/64
[52] U.S. Cl. ................................ 425/590; 425/451.2; 425/451.9; 425/595
[58] Field of Search ............ 425/589, 590, 595, 450.1, 425/451.2, 451.9, DIG. 221

[56] References Cited

U.S. PATENT DOCUMENTS

| | | | |
|---|---|---|---|
| 2,916,768 | 12/1959 | Quere et al. | 425/451.9 |
| 3,449,795 | 6/1969 | Fischbach | 425/DIG. 221 |
| 3,465,387 | 9/1969 | Allard et al. | 425/590 |
| 3,540,081 | 11/1970 | Carrieri et al. | 425/595 |
| 3,768,953 | 10/1973 | Dangremond et al. | 425/DIG. 221 |
| 3,801,256 | 4/1974 | Farrell | 425/595 |
| 4,243,369 | 1/1981 | James | 425/451.9 |
| 4,372,738 | 2/1983 | Black et al. | 425/595 |
| 4,685,876 | 8/1987 | Loscei | 425/595 |
| 4,849,151 | 7/1989 | Tamura et al. | 425/451.9 |
| 4,964,792 | 10/1990 | Katayama et al. | 425/451.9 |
| 5,066,217 | 11/1991 | Fukuzawa et al. | 425/451.9 |

FOREIGN PATENT DOCUMENTS

| | | | |
|---|---|---|---|
| 56-7860 | 2/1981 | Japan | 425/595 |
| 60-82309 | 10/1985 | Japan . | |

Primary Examiner—Jay H. Woo
Assistant Examiner—James P. Mackey
Attorney, Agent, or Firm—Sughrue, Mion, Zinn Macpeak & Seas

[57] ABSTRACT

A mold clamping apparatus for use in molding machines such as injection molding machines, diecasting machines and press molding machines. The mold clamping apparatus includes a base; a fixed panel and a movable panel disposed on the base and respectively supporting mold halves; a plurality of tie bars each having a screw shaft at one end thereof which passes through the movable panel; a plurality of clamping cylinders disposed on the fixed panel for clamping an other opposite end of the tie bars when the mold apparatus is in a closed position; a mechanism for moving the movable panel toward and away from the fixed panel; an adjusting mechanism, disposed on the movable panel, for simultaneously fixedly adjusting the axial position of the plurality of tie screws with respect to the movable panel such that the distance between the movable panel and the fixed panel when the mold apparatus is in the closed position can correspondingly be adjusted so as to accommodate molds of varying sizes.

12 Claims, 3 Drawing Sheets

MOLD CLAMPING APPARATUS FOR MOLDING APPARATUS

This is a Continuation of Application No. 07/734,997, filed Jul. 24, 1991, now abandoned.

BACKGROUND OF THE INVENTION

1. Field of the Invention

This invention relates to a mold clamping apparatus for use in molding machines such as injection molding machines, die-casting machines and press molding machines.

2. Background

A mold clamping apparatus for large molding machines is disclosed in Japanese Patent Unexamined Publication No. 82309/1985. The apparatus includes a plurality of clamping cylinders disposed at predetermined positions outside a fixed panel. The piston rods of the respective clamping cylinders are used as tie bars and are inserted into insertion holes arranged on the movable panel such that the movable panel is coupled integrally with the tie bars through engagement with a screw disposed outside the movable panel, so that mold halves respectively mounted on the fixed panel and the movable panel can be clamped together by the clamping cylinders.

In such a mold clamping apparatus, differences in mold thicknesses are accommodated by adjusting the position of engagement between a screw disposed around the front end of each tie bar and a corresponding pair of semi-circular internally threaded chucks disposed outside the movable panel using the clamping cylinder. This requires a long cylinder stroke, entailing problems such as difficulties in maintaining machining accuracy and reasonable cost. It is also difficult to make slight adjustments to account for deviations between screws by hydraulically operating large-diameter pistons, thus requiring cumbersome operations.

In addition, the coupling of the tie bars with their corresponding pairs of chucks through engagement can only be done after the time in which the movable panel is stopped after the mold has been completely closed. Therefore, the time required for coupling is relatively long compared with mold clamping apparatuses of ordinary structure in which such coupling is dispensed with. Thus, this apparatus demands a longer molding cycle due to this additional coupling time.

SUMMARY OF THE INVENTION

The present invention has been made to overcome the above conventional problems. Accordingly, an object of the present invention is to provide a novel mold clamping apparatus for molding machines which is capable of adjusting mold thicknesses by moving the tie bars without operating the clamping cylinders, capable of easily making fine adjustments to each of the tie bars individually to adjust their engagement positions, and capable of coupling the tie bars with the clamping pistons.

To achieve the above object, the present invention is applied to a mold clamping apparatus for molding machines having the following features. A movable panel is disposed so as to be movable forward and backward with respect to a fixed panel which is supported on a base. A plurality of clamping cylinders, each having a clamping piston with a tie bar receiving hole and a tie bar coupling device having a pair of chucks on lateral sides of the clamping piston, are arranged at predetermined positions outside the fixed panel. At positions on the movable panel are disposed a plurality of tie bars arranged so as to correspond with the clamping cylinders, respectively, the front end of each of the tie bars being formed into a screw shaft. The movable panel is moved by a mold opening/closing cylinder. In such a mold clamping apparatus, a rear end portion of each tie bar is formed into a screw shaft so that the tie bar can pass through the movable panel, and a rotating member and a mold thickness adjusting device are disposed on the movable panel. Each of the rotating members is fixed at a predetermined position and threaded with the screw shaft, and the mold thickness adjusting device includes a chain for rotating the tie bar rotating members simultaneously and a motor for conveying the chain. A device for adjusting the position of engagement between the pair of chucks of the coupling device and the corresponding tie bar, is also arranged on each clamping cylinder.

In the above construction, as the chain on the movable panel is circularly conveyed by the motor, the rotating members of the respective tie bars rotate at their fixed positions simultaneously, causing the respective tie bars to move in the axial direction simultaneously. As a result, the length between the movable panel and the fixed panel is varied, thereby permitting mold thickness adjustment. The semi-circular, internally threaded chucks and the screw shaft at the front end of each tie bar can be engaged by the engagement position adjusting device on the clamping cylinder at all times.

BRIEF DESCRIPTION OF THE DRAWINGS

The drawings show an exemplary mold clamping apparatus according to the present invention wherein.

DETAILED DESCRIPTION OF THE PREFERRED EMBODIMENT

Figure 1:
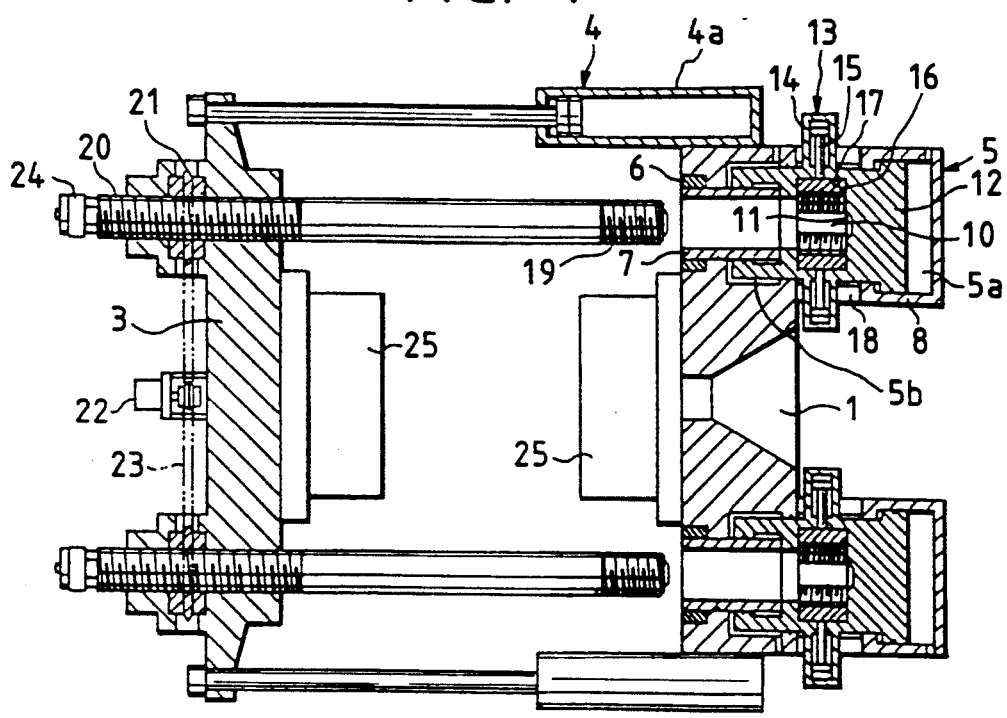
FIG. 1 is a plan, sectional view of the mold clamping apparatus in the open position.
Figure 2:
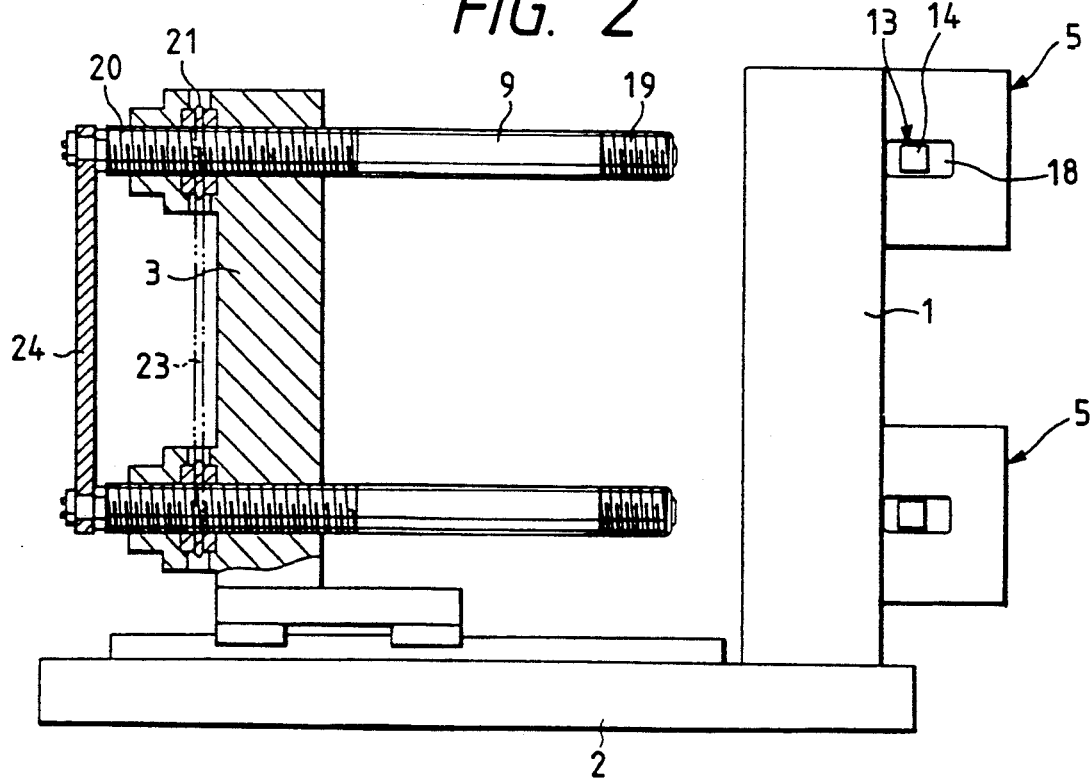
FIG. 2 is a sectional view in which a movable panel is longitudinally sectioned and in an open position.

Referring to the figures, a fixed panel 1 extends vertically from a side of a base 2 and a movable panel 3 is vertically disposed on the base 2 so as to be movable toward the fixed panel 1. A mold opening/closing cylinder 4 is provided for moving the movable panel 3 relative to the fixed panel 1. The mold cylinder 4 includes a cylinder 4a secured to the fixed panel 1 and a rod 4b secured to the movable panel.

Proximate the four corners of the fixed panel 1 are clamping cylinders 5 disposed integrally therewith. Inside the fixed panel 1 at which each clamping cylinder 5 is positioned is a sleeve 7 having a screw ring 6 screwed around its outer surface at the inner end. The sleeve 7 is inserted into the clamping cylinder 5 by a guide member (not shown) so as to be movable in the axial direction to act as a tie bar insertion hole.

Each clamping cylinder 5 includes a cylinder 8 integral with the fixed panel 1 and a clamping piston 12.

The clamping piston 12 has a hole 10 which, together with the sleeve 7, receives a tie bar 9 of the movable panel 3 in the axial direction and has a truncated conical recess 11 in the middle of the inner wall thereof which serves as a receiving hole end. On a lateral side of each clamping piston 12 is a tie bar coupling device 13.

Each coupling device 13 includes cylinders 14 and semi-circular chucks 17, having internally threaded surfaces, integrally arranged on diametrically opposite sides of the clamping piston 12. Each chuck 17 is coupled to the tip of a piston rod 15 and accommodated in a tubular recess 16 formed inside the receiving hole 10 so that each chuck 17 faces the receiving hole 10. The cylinder 14 is moved together with the clamping piston 12 along an oblong hole 18 which is arranged in the cylinder 8 of the clamping cylinder 5.

The tie bars 9 are inserted through the movable panel 3, so as to be horizontally movable, at positions corresponding to the position of clamping cylinders 5 disposed near the four corners of the movable panel 3. A front end of each tie bar 9 and a rear end thereof inserted through the movable panel 3 are threaded into screw shafts 19, 20, respectively, having the same pitch. The front end is engageable with the recess 11 of the clamping piston 12, and the rear end is provided with a spanner hook 19a (FIG. 4) for rotating the tie bar.

Figure 3:
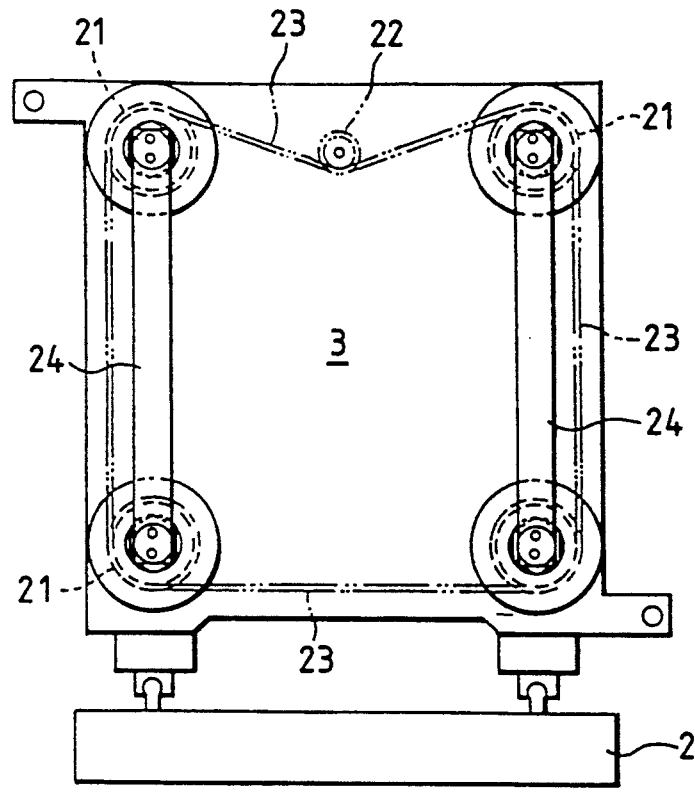
FIG. 3 is an end view of the movable panel.
Figure 4:
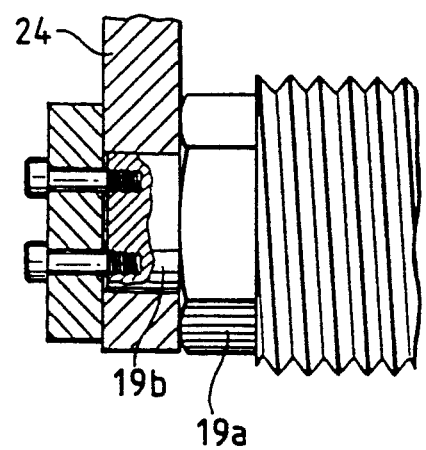
FIG. 4 is a partial sectional, plan view of a rear end of a tie bar.

Sprockets 21 fixed at predetermined positions on the movable panel 3 are screwed into the corresponding screw shafts 20 and are engaged with a chain 23 circumscribing the sprockets, as illustrated in FIG. 3. A motor 22 mounted on the movable panel 3 drives the chain 23 so as to convey the four tie bars 9 forward and backward simultaneously. Each pair of upper and lower tie bars 9 has a member 24 installed to a shaft end 19b which protrudes from the spanner hook 19a, thereby preventing each tie bar from rotating together with the corresponding sprocket 21, as illustrated in FIG. 4. Reference numeral 25 designates mold halves respectively secured to the fixed and movable panels.

Figure 5:
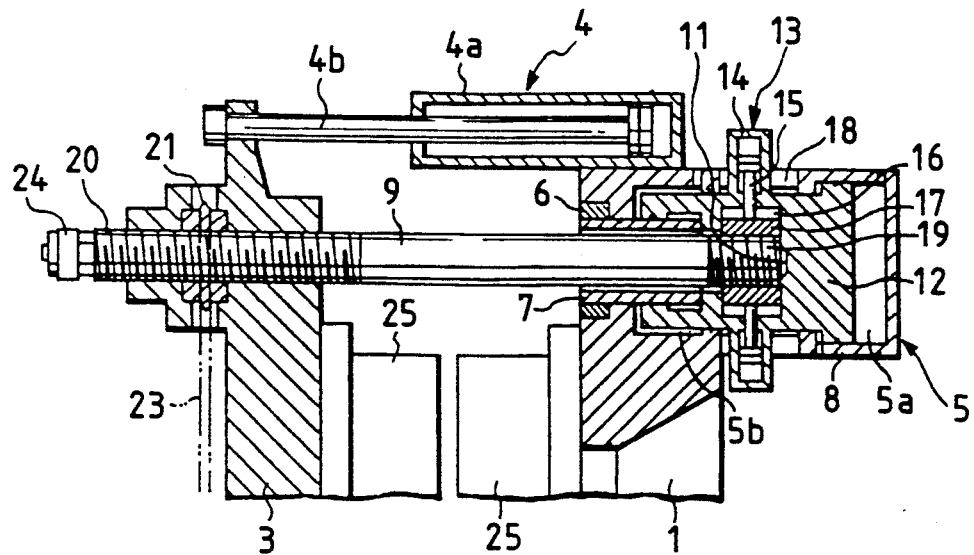
FIG. 5 is a partial plan view illustrating the clamping of the tie bars.

A clamping operation will now be described. From a state in which the mold is opened, as shown in FIG. 1, the movable panel 3 is advanced toward the fixed panel 1 by the opening closing cylinder 4. As shown in FIG. 5, the advancement of the movable panel 3 causes the screw shaft 19 at the front end of the tie bar 9 to enter into the clamping piston 12 through the sleeve 7. The shaft 19 comes into contact with the inner wall of the piston and the projection at its front end engages the recess 11 before the mold is completely closed. At this moment, each tie bar 9 is aligned with the corresponding clamping piston 12 so that its front end is supported by the piston 12.

Figure 6:
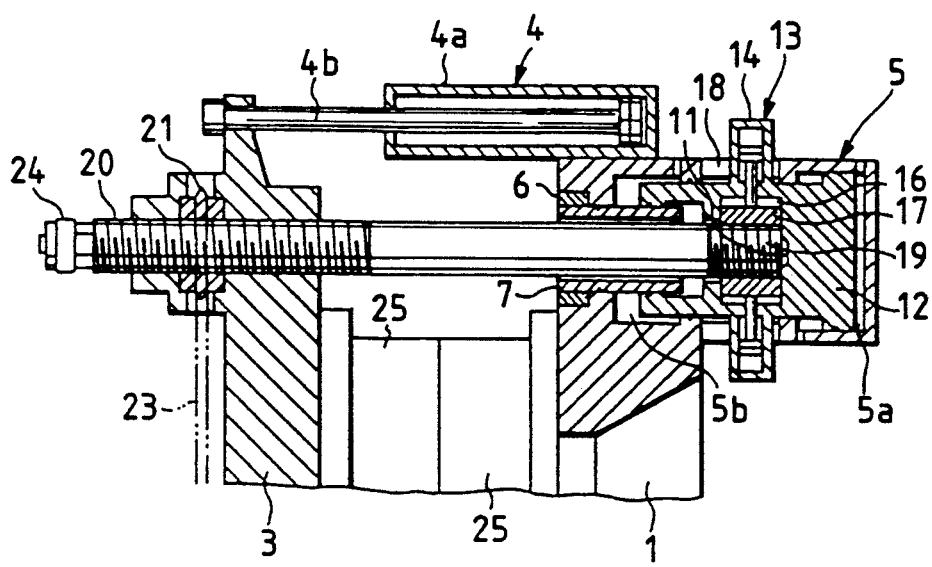
FIG. 6 is a partial sectional, plan view at the time of high-pressure clamping.

Upon abutment of the tie bar 9, the clamping piston 12 moves to a mold closure completion position together with the tie bar 9 while discharging a hydraulic fluid in a rear fluid chamber 5a thereof. As a result, the mold closing speed is decelerated. The abutment of the screw shaft 19, at the front end of the tie bar 9, against the inner wall of the piston 12 further causes the shaft 19 to oppose the pair of chucks 17 of the coupling device 13 in a stationary state. As a result, the piston 12 is operated hydraulically during the decelerated phase to thereby cause the chucks 17 to clamp the front end of the tie bar 9, as shown in FIG. 5. After clamping is sensed by a limit switch or switches (not shown) and the clamping closure is confirmed, the hydraulic fluid is supplied to a front fluid chamber 5b as shown in FIG. 6 and high-pressure clamping is then performed.

Upon completion of a molding operation, the hydraulic fluid is supplied to the rear fluid chamber 5a, and the fluid in the front fluid chamber 5b is discharged from the clamping piston 12 so as to start opening the mold. Simultaneously therewith, the clamping is released since the screw shaft 19 of the tie bar 9 remains stationary with respect to the chucks 17 of the coupling device 13. After the power mold has been completed, the mold is opened by the mold opening/closing cylinder 4.

If it is necessary to adjust the thickness of the mold because an old mold is replaced with a new one, the movable panel 3 is moved by the mold opening/closing cylinder 4 after the new mold has been installed, and the replaced mold is then closed. Mold closing causes the front end of each tie bar 9 to enter into the corresponding clamping piston 12. If the thickness of the new mold is greater than that of the old mold, the front end of the tie bar stops at a position further away from the inner wall of the piston 12, a distance corresponding to the difference between the two thicknesses of the old and new molds. Thus, in this case, the sprockets 21 are rotated by the chain 23 which is driven by the motor 22 so that the four tie bars 9 may be moved forward simultaneously and the front end of each tie bar 9 may be abutted against the inner wall of the corresponding clamping piston 12. On the other hand, if the new mold is thinner than the old one, the tie bars 9 may be moved backward and aligned.

At the time the machine is assembled, all the tie bars 9 are not necessarily brought into abutment under the same condition, and the position of engagement between the chucks 17 and the corresponding screw shaft 19 set by referencing the abutment position may also be slightly different from one tie bar to another. Thus, each engagement position must be adjusted finely by the corresponding clamping cylinder 5. Such adjustment can be made easily by slightly rotating each tie bar 9 by the spanner 19a to change the engagement position.

As described in the foregoing, the rear end portion of each tie bar is formed into a screw shaft which is movably inserted into the movable panel. The mold thickness adjusting device is fixed to the movable panel and includes rotating members, each disposed at a fixed position and screwed into the screw shaft, and a motor driven chain which simultaneously rotates the rotating member of each tie bar. As a result, the cylinder stroke can be made shorter than in the case where mold thicknesses are adjusted by changing the length of each tie bar by the clamping cylinder, thereby facilitating the maintenance of machining accuracy and reducing the fabrication cost.

Further, since the mold thicknesses can be adjusted by moving all the tie bars simultaneously, the adjustment can be completed more quickly than in the case where adjustments are made for tie bar individually. Further, the position of engagement between the chucks of the coupling device disposed on the lateral side of the clamping piston and the screw shaft at the front end of the corresponding tie bar can be adjusted by the adjusting device disposed on the clamping cylinder of each tie bar. As a result, none of the tie bars deviate from their engagement positions. Furthermore, the coupling of the clamping piston with the tie bar by engagement can be performed in the final decelerated phase of clamping, thereby providing advantages such as reducing the time required for the mold closing process and improving the molding cycle.

While the invention has been described in detail, and with reference to specific embodiments thereof, it will be apparent to one of ordinary skill in the art that various changes and modifications can be made therein without departing from the spirit and scope thereof.

What is claimed is:

1. A mold clamping apparatus, comprising:
   a base;
   a fixed panel and a movable panel disposed on said base and respectively supporting mold halves;
   a plurality of tie bars each having a screw shaft at one end thereof which passes through one of said movable panel and said fixed panel, said movable panel being movable to move said tie bars in a longitudinal direction thereof;
   a plurality of clamping cylinders disposed on another of said fixed panel and said movable panel for clamping an other, opposite end of said tie bars when said mold clamping apparatus is in a closed position;
   moving means for moving said movable panel toward and away from said fixed panel; and
   adjusting means, disposed on said one panel, for simultaneously fixedly adjusting the axial position of said plurality of tie bars with respect to said one panel such that the distance between said movable panel and said fixed panel when said mold clamping apparatus is in the closed position is correspondingly adjusted so as to accommodate molds of varying sizes, wherein said clamping cylinders each include:
   a clamping piston having a hole and slidably disposed in a hydraulic cylinder, to which hydraulic fluid is supplied, so as to be moveable in said longitudinal direction, said clamping piston being positioned in a line of travel of a corresponding one of said tie bars such that during movement of said movable panel and said corresponding tie bar to a mold closing position said corresponding tie bar abuts against said clamping piston causing said piston to move to a mold closing piston position thereby compressing said hydraulic fluid in a chamber of said cylinder and decelerating said corresponding tie bar;
   means for allowing said hydraulic fluid in said chamber to be discharged during deceleration of said tie bar to cushion said deceleration; and
   a tie bar coupling device disposed on lateral sides of said clamping piston for clamping said other end of said corresponding tie bar, said coupling device being moveable with said clamping piston in said longitudinal direction so as to clamp said corresponding tie bar during said deceleration thereof.

2. The clamping apparatus of claim 1 wherein said adjusting means comprises:
   a sprocket threadably disposed on each of said tie bars and fixed at predetermined positions on said movable panel in the longitudinal direction of said tie bars;
   rotation preventing means for preventing each of said tie bars from rotating with respect to said movable panel; and
   rotating means for simultaneously rotating each of said sprockets relative to said tie bars such that said tie bars are moved in said longitudinal direction with respect to said movable panel.

3. The clamping apparatus of claim 2 wherein said rotating means comprises:
   a chain circumscribing and engaged with each of said sprockets; and
   means for conveying said chain.

4. The clamping apparatus of claim 2 wherein said rotation preventing means comprises a plurality of bars having opposite ends respectively fixedly connected to said one end of pairs of said tie bars.

5. The clamping apparatus of claim 1 wherein said tie bar coupling device comprises:
   a plurality of chucks circumferentially disposed on said clamping piston with respect to said hole; and
   urging means provided for each of said chucks for urging each of said chucks toward said hole so as to clamp said other end of said corresponding tie bar.

6. The clamping apparatus of claim 5 wherein said other end of each of said tie bars is threaded and wherein an internal surface of each of said chucks is correspondingly threaded to engage said other threaded end of each of said tie bars.

7. The clamping apparatus of claim 5 wherein each of said urging means comprises a piston rod contacting each said chuck slidably disposed in a cylinder which can be pressurized to force each said chuck toward said hole.

8. The clamping apparatus of claim 1, further comprising means for individually adjusting the axial position of said tie bars on said movable panel with respect to one another.

9. A mold clamping apparatus, comprising:
   a base;
   a fixed panel and a movable panel disposed on said base and respectively supporting mold halves;
   a plurality of tie bars each having a screw shaft at one end thereof which passes through said one of said movable panel and said fixed panel;
   a plurality of clamping cylinders disposed on another said fixed panel and said movable panel for clamping an other, opposite end of said tie bars when said mold clamping apparatus is in a closed position; and
   a movable panel driving mechanism interconnecting said movable panel to one of said base and said fixed panel, said driving mechanism moving said movable panel toward and away from said fixed panel in a longitudinal direction, wherein said clamping cylinders each include:
   a clamping piston slidably disposed in a hydraulic cylinder, to which hydraulic fluid is supplied, so as to be moveable in said longitudinal direction, said clamping piston being positioned in a line of travel of a corresponding one of said tie bars such that during movement of said movable panel and said corresponding tie bar to a mold closing position said corresponding tie bar abuts against said clamping piston causing said piston to move to a mold closing piston position thereby compressing said hydraulic fluid in a chamber of said cylinder and decelerating said corresponding tie bar;
   means for allowing said hydraulic fluid in said chamber to be discharged during deceleration of said tie bar to cushion said deceleration; and
   a tie bar coupling device disposed on lateral sides of said clamping piston for clamping said other end of said corresponding tie bar, said coupling device being movable with said clamping piston in said longitudinal direction so as to clamp said corresponding tie bar during said deceleration thereof.

10. The clamping apparatus of claim 9, further comprising an adjusting mechanism disposed on said movable panel and connected to said tie bars, wherein said adjusting mechanism fixedly adjusts the axial position of said plurality of tie bars with respect to said movable panel such that the distance between said movable panel and said fixed panel, when said mold clamping apparatus is in the closed position, is correspondingly adjustable to accommodate molds of varying sizes, wherein said adjusting mechanism comprises:

a sprocket threadedly disposed on each of said tie bars and fixed at predetermined positions on said movable panel in the longitudinal direction of said tie bars;

a retainer secured to each of said tie bars to prevent each of said tie bars from rotating with respect to said movable panel; and a rotating mechanism connected to each of said sprockets, said rotating mechanism simultaneously rotating each of said sprockets relative to said tie bars such that said tie bars are moved in said longitudinal direction with respect to said movable panel.

11. The clamping apparatus of claim 10 wherein said rotating mechanism comprises:

a chain circumscribing and engaged with each of said sprockets; and means for conveying said chain.

12. The clamping apparatus of claim 10 wherein said retainer includes a plurality of bars having opposite ends respectively fixedly connected to said one end of pairs of said tie bars.

* * * * *